United States Patent [19]
Ichikawa

[11] Patent Number: 5,642,235
[45] Date of Patent: Jun. 24, 1997

[54] LENS SUPPORTING DEVICE

[75] Inventor: Mituru Ichikawa, Tokyo, Japan

[73] Assignee: Asahi Kogaku Kogyo Kabushiki Kaisha, Tokyo, Japan

[21] Appl. No.: 585,638

[22] Filed: Jan. 16, 1996

[30] Foreign Application Priority Data

Jan. 17, 1995 [JP] Japan ................................. 7-005333

[51] Int. Cl.⁶ ................................................. G02B 7/02
[52] U.S. Cl. ........................... 359/811; 359/818; 359/827; 359/828; 396/529
[58] Field of Search ........................ 359/811, 818, 359/819, 820, 827, 828

[56] References Cited

U.S. PATENT DOCUMENTS

| 4,239,364 | 12/1980 | Doi | 359/828 |
|---|---|---|---|
| 4,307,954 | 12/1981 | Ludwig | 354/286 |
| 4,659,203 | 4/1987 | Niwa et al. | 354/286 |
| 4,733,945 | 3/1988 | Bacich | 359/820 |
| 5,117,311 | 5/1992 | Nomura | 359/819 |
| 5,177,641 | 1/1993 | Kobayashi et al. | 359/820 |
| 5,249,082 | 9/1993 | Newman | 359/827 |
| 5,428,482 | 6/1995 | Bruning et al. | 359/827 |
| 5,467,229 | 11/1995 | Rumsey et al. | 359/818 |

*Primary Examiner*—Loha Ben
*Attorney, Agent, or Firm*—Greenblum & Bernstein P.L.C.

[57] ABSTRACT

A lens having radially extending members provided with convex engaging projections is positioned and secured in a lens supporting sleeve having L-shaped openings with recessed engaging grooves. The radially extending members are positioned with respect to a reference surface of the sleeve, and subsequently elastically deform circumferentially extending clamping arms of the sleeve as they are rotated into clamping portions of the L-shaped openings. The convex engaging projections are then snapped into the engaging grooves, holding the lens in position.

19 Claims, 10 Drawing Sheets

LENS SUPPORTING DEVICE

BACKGROUND OF THE INVENTION

The present invention relates to a supporting device for supporting a plastic lens in a lens supporting sleeve.

One known lens supporting device uses a pressing ring structure. That is, a stepped portion is formed inside the lens supporting sleeve for defining the position of the lens, and the lens is secured by screwing the pressing ring into threads in the lens supporting sleeve and pressing the lens against the stepped portion. Also known is a flange structure, wherein a flange portion is formed on an outer periphery of the plastic lens, and this flange portion is screwed to the lens supporting sleeve with a fixing screw. With the aforementioned structures, an extra securing member (the lens pressing ring or fixing screw) is necessary. Accordingly, production, control, and assembly for the parts becomes complicated. With the former construction, the size in the axial direction increases, and with the latter, the size in the radial direction increases, so it is difficult to make the lens compact. Also known are structures using adhesion or welding to fix a lens. The use of adhesives increases the overall cost, and assembling workability is poor. If welding is used, a welding machine must be included in the assembly process. Furthermore, welding is difficult to control, often creating defects.

SUMMARY OF THE INVENTION

It is therefore an object of the present invention to provide an improved:lens supporting structure that is inexpensive, compact, and capable of limiting the parts in the supporting structure to only the combination of the lens and its supporting sleeve.

In order to meet the objects of the invention, a lens supporting device, includes: a cylindrical lens supporting sleeve having a L-shaped opening formed in one end, the L-shaped opening having a guide portion and a clamping portion, the guide portion being open at the one end and extending from the one end in an axial direction of the lens supporting sleeve, the clamping portion being open at the guide portion and extending in a circumferential direction of the lens supporting sleeve from the guide portion; and a plastic lens having a circular rim portion and a unitarily formed radially extending member, the circular rim portion being slip fit into the cylindrical lens supporting sleeve, and the radially extending member being clamped by the clamping portion of the L-shaped opening.

In this manner, the lens is securely clamped and positioned with an easily accomplished assembly. The slip fit helps to align and locate the lens, and the clamping portion both locates and holds the lens in place.

Preferably, the radially extending member is clamped by the clamping portion of the. L-shaped opening by inserting the radially extending member into the guide portion of the L-shaped opening and rotating the radially extending member into the clamping portion Of the L-shaped opening. This provides a particularly simple assembly operation.

In a particularly advantageous development of the invention, the clamping portion of the L-shaped opening further includes an introduction surface and a clamping surface, and the introduction surface progressively narrows the clamping portion and leads the radially extending member to the clamping surface, and the clamping Surface clamps and secures the radially extending member in place.

In this case, the clamping surface may include an engaging groove extending transverse to the direction of the rotation into the clamping portion, and the radially extending member may include a matching engaging projection on a surface facing the clamping surface, and the engaging projection engages the engaging groove when the radially extending member is rotated into the clamping portion. Thus, the radially extending member can be "snapped" into position as the engaging member and engaging projection connect, thus securing the lens in place. In this case, the engaging projection preferably elastically deforms the lens supporting sleeve as the radially extending portion is rotated into the clamping portion, and the lens supporting sleeve elastically returns when the engaging projection engages the engaging groove.

According to one particular development of the invention, a plurality of the L-shaped openings are formed in the one end of the lens supporting sleeve, the L-shaped openings being evenly circumferentially distributed about the one end, and each of the clamping portions extending in the same circumferential direction as each other. Further, a plurality of the radially extending members are formed on the lens, each of the radially extending members being alignable to the guide portion of a corresponding one of the L-shaped openings, and the radially extending members being inserted into the guide portions of the corresponding L-shaped openings and rotated into the clamping portion of the corresponding L-shaped openings. Securing the lens by a plurality of clamped members provides evenly distributed positioning and clamping action.

According to another development of the invention, a lens supporting device includes: a plastic lens, the plastic lens including a circular rim, and a plurality of radially extending members, radially extending from the circular rim at predetermined angular intervals; and a lens supporting sleeve for accepting and supporting the plastic lens. The lens supporting sleeve includes: a reference surface at an end portion thereof, contactable to the radially extending members of the plastic lens, for defining an axial position of the plastic lens, a plurality of circumferentially extending resilient clamping arms, each of the arms extending in the same circumferential direction as each other, and each of the clamping arms having one end portion integral with the lens supporting sleeve and a remaining end portion substantially parallel to and having a predetermined separation from the reference surface, and a plurality of guide portions formed in the lens supporting sleeve, for guiding the radially extending members of the plastic lens to the separations between the resilient clamping arms and the reference surface, and wherein the plastic lens is fit into the lens By inserting the radially extending members into the guide portions until the circular rim contacts the supporting sleeve, and the radially extending members are fit into the separations between the resilient clamping arms and the reference surface by rotating the lens relative to the lens supporting sleeve.

Accordingly, the plastic lens is located by the reference surface and held by the clamping arms in an easily accomplished assembly procedure. The entire positioning and securing device uses only the lens and lens supporting sleeves, and the members and openings integrally formed therein.

Preferably, a convex portion is formed on at least one of the radially extending members and the resilient clamping arms, and a corresponding recessed portion is formed in at least one of the remaining one of the members or arms, and the convex portion and the recessed portion engage when the radially extending members are fit into the separations between the resilient clamping arms and the reference surface. This provides a "snap-in" action, and the lens is therefore easily secured and located In the lens supporting sleeve.

According to another aspect of the present invention, a lens supporting device includes: a plastic lens having a circular rim portion and a plurality of unitarily formed extensions extending from the circular rim portion; and a lens supporting sleeve includes: a lens seat at one end of the lens supporting sleeve, for accepting the circular rim portion; a reference surface at the one end of the lens supporting sleeve; clamping means for resiliently biasing each of the extensions individually against the reference surface; engaging means for engaging the extensions and for preventing rotation of each of the extensions individually with respect to the reference surface; and guiding means for guiding the unitarily formed extensions to be engaged by the engaging means. The lens is thereby first guided into the lens supporting sleeve, clamped in position with respect to a reference surface, and engaged to be permanently fixed in the set position. The assembly is simple, and uses few parts.

In this case, the clamping means preferably includes a plurality of circumferentially extending resilient clamping arms, each of the arms extending in the same circumferential direction as each other, and each of the clamping arms having one end portion integral with the lens supporting sleeve, and a remaining end portion substantially parallel to and having a predetermined separation from the reference surface.

Further preferably, the means for engaging includes a plurality of recessed portions for engaging the extensions, the recessed portions being formed in the resilient clamping arms opposing the extensions.

Still further preferably, the guiding means includes a plurality of guides formed in the lens supporting sleeve, each of the guides leading a corresponding one of the extensions from the one end of the lens supporting sleeve to the engaging means.

DETAILED DESCRIPTION OF THE PREFERRED EMBODIMENTS

Figure 1:
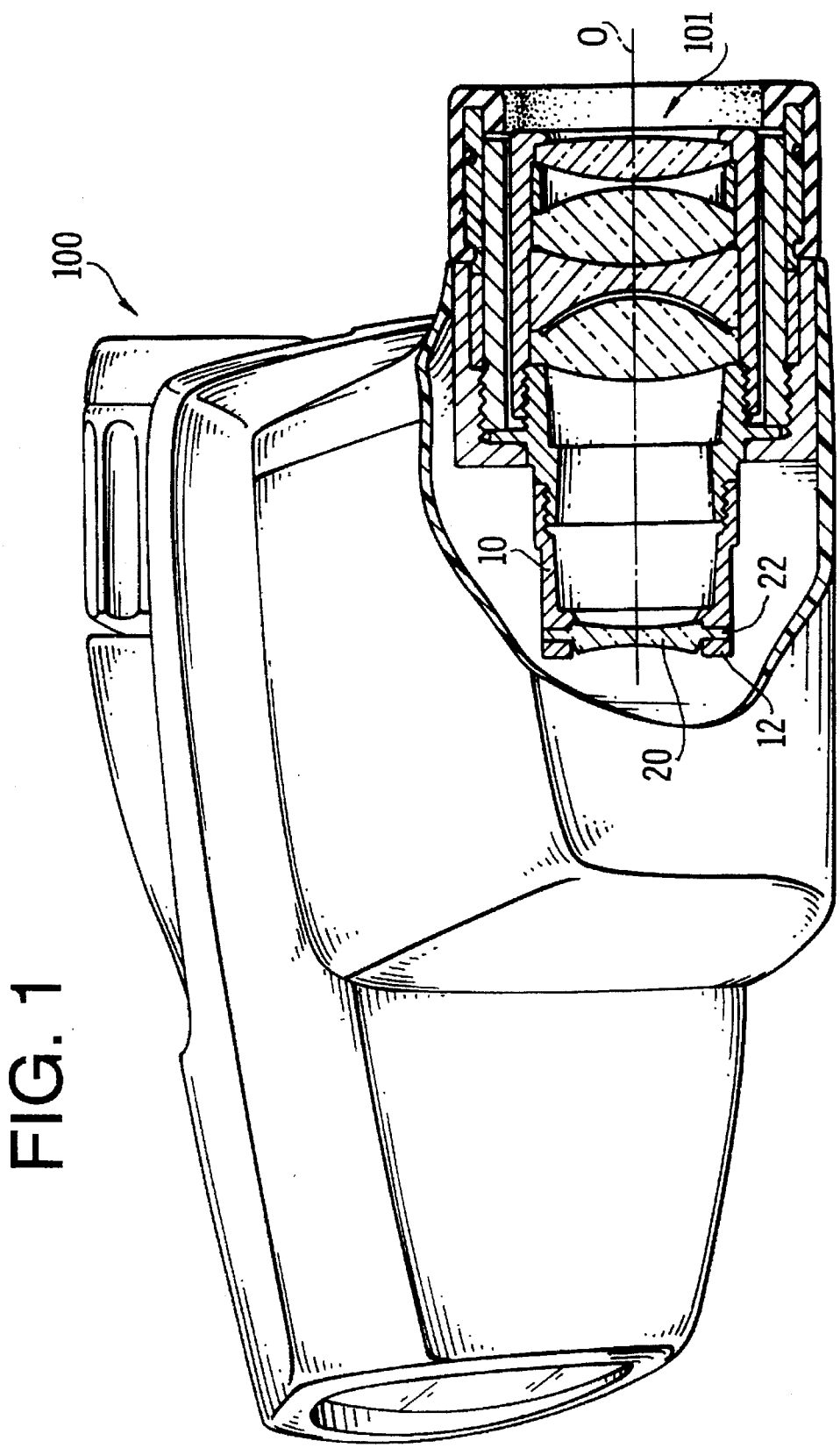
FIG. 1 is a cutaway view of an eyepiece portion of a binocular employing the embodiment of the present invention.

FIG. 1 Shows an eyepiece lens assembly of a binocular 100 which employs an embodiment of a lens supporting device according to the present invention. In the eyepiece lens assembly shown in FIG. 1, a lens supporting sleeve 10 made of plastic is fixed in front of an eyepiece lens group 101, and a plastic lens 20, constituting a part of an objective lens group, is fixed at the front end portion of the lens supporting sleeve 10. In the context of this specification "axial" direction and position are along the direction of optical axis 0 of the lens 20.

Figure 2:
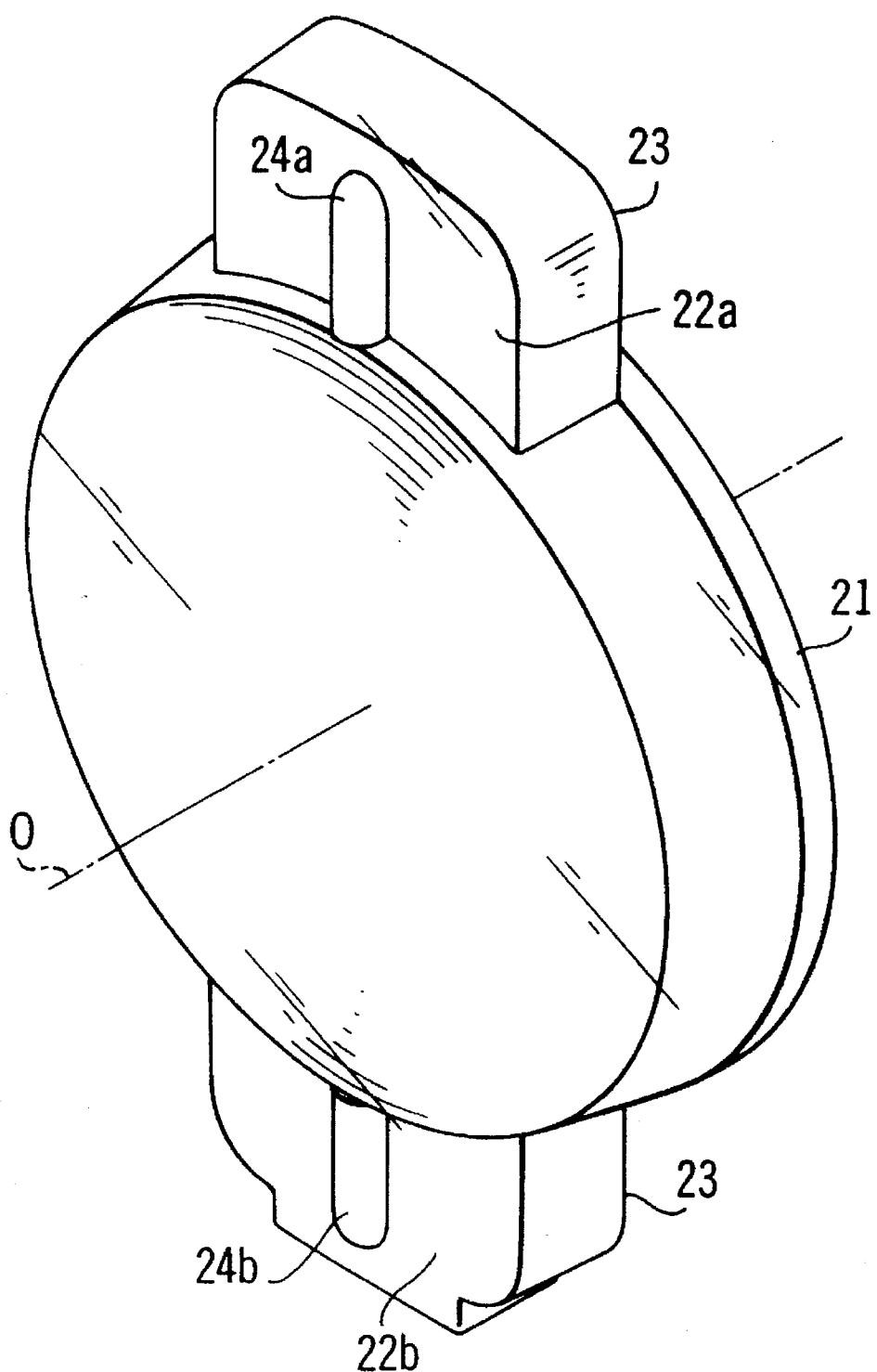
FIG. 2 is a perspective view of a lens portion to be employed in the embodiment of a lens supporting device.
Figure 3:
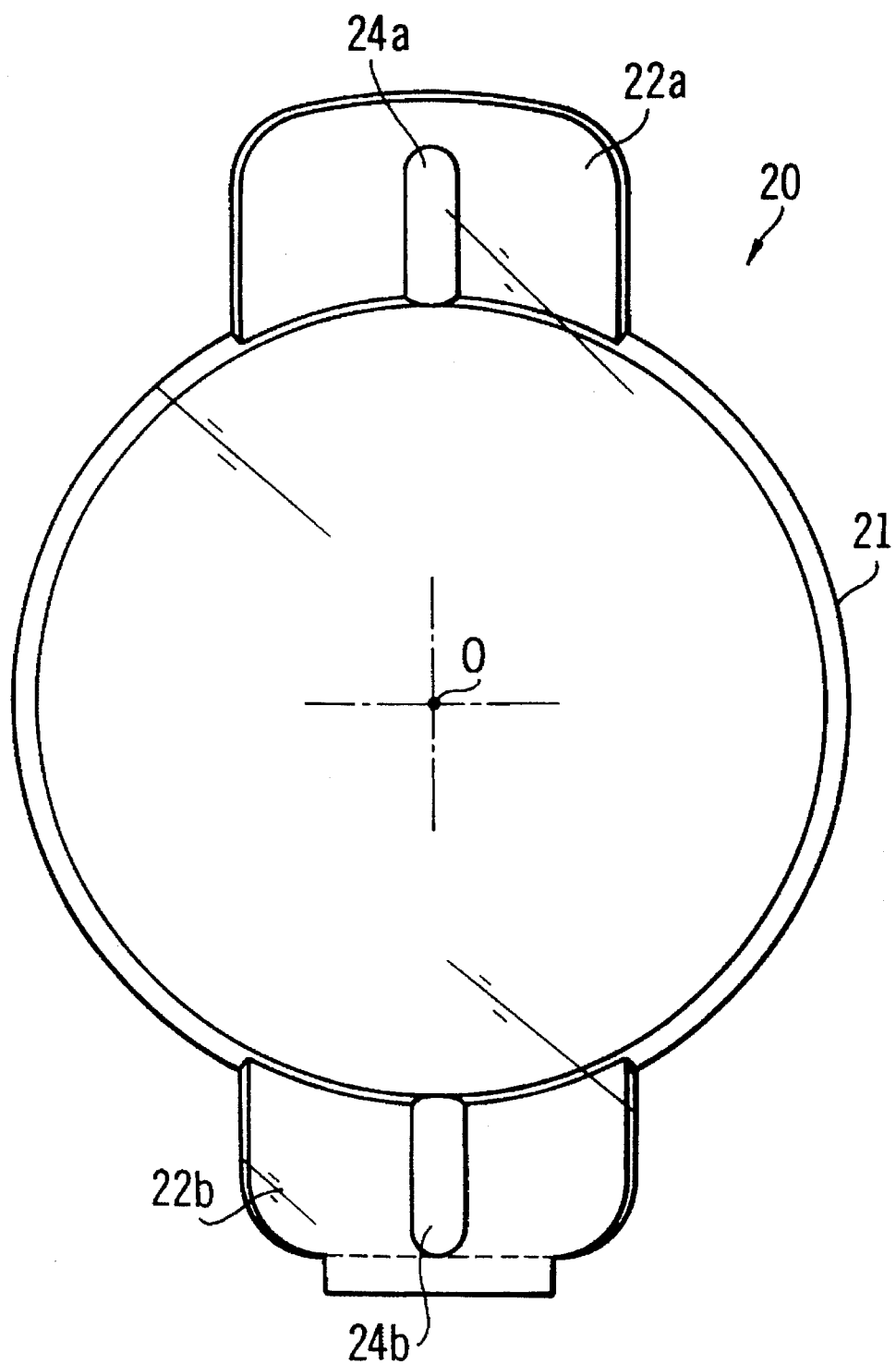
FIG. 3 is a front view of the lens portion of FIG. 2.
Figure 4:
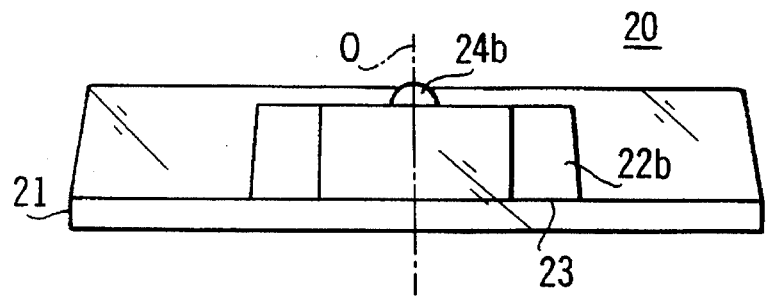
FIG. 4 is a bottom view of the lens portion of FIG. 2.
Figure 5:
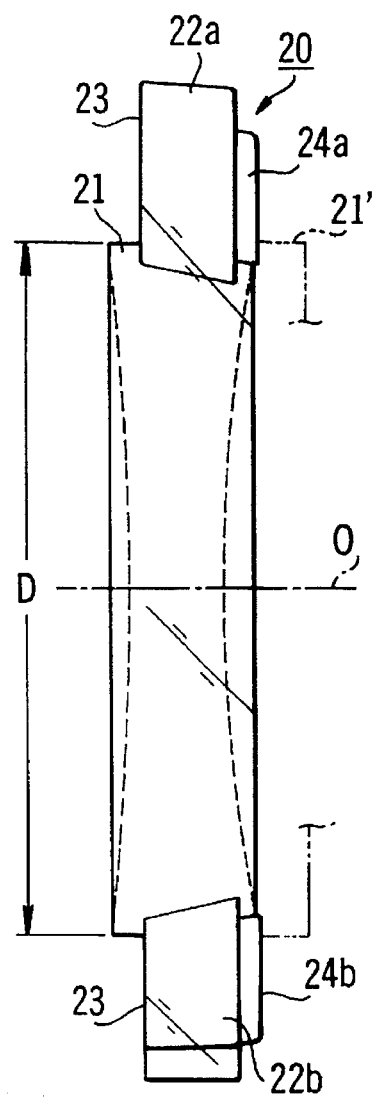
FIG. 5 is left side view of the lens portion of FIG. 2.

FIGS. 2 through 5 how view of a plastic lens 20 that forms a portion of the lens supporting device of the embodiment. FIG. 2 is a perspective view of the lens 20, and FIGS. 3 through 5 are orthographic views of the same. The plastic lens 20 is provided with a circular rim portion and two radially extending members 22a, 22b, radially extending away from the circular rim portion 21 of the lens 20, and arranged on diametrically opposite sides of the lens 20. The rear surface (from the viewpoint of FIG. 3) of the two radially extending members 22a and 22b, constitutes a positioning surface 23. Convex engaging projections 24a, 24b are formed on the front surface of the radially extending members 22a, 22b, respectively, protruding in the (optical) axial direction. The plastic lens 20 has a substantially symmetric shape when rotated 180 degrees about the optical axis O.

Figure 6:
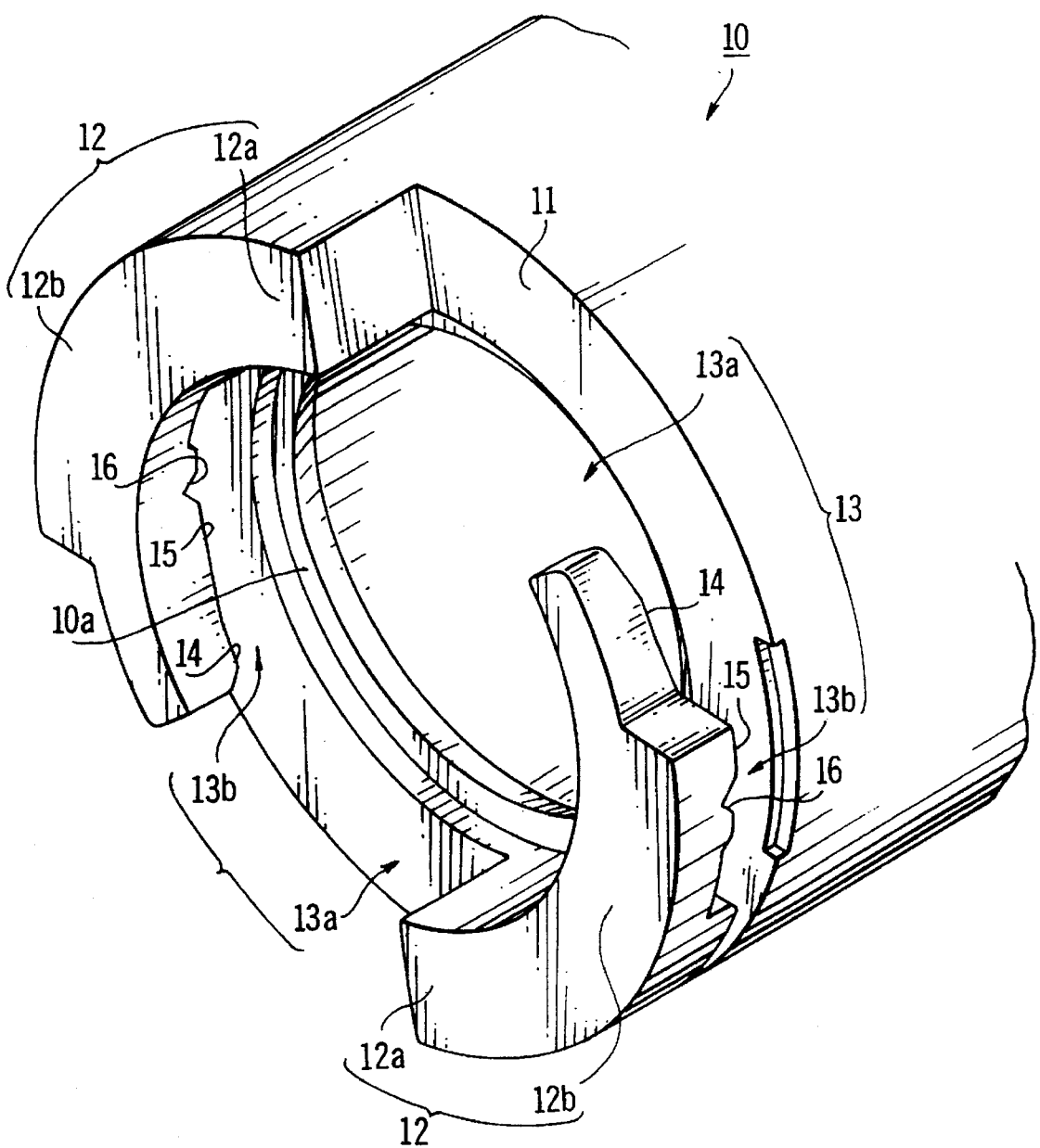
FIG. 6 is a perspective view of a lens supporting sleeve to be employed in the embodiment of a lens supporting device.
Figure 7:
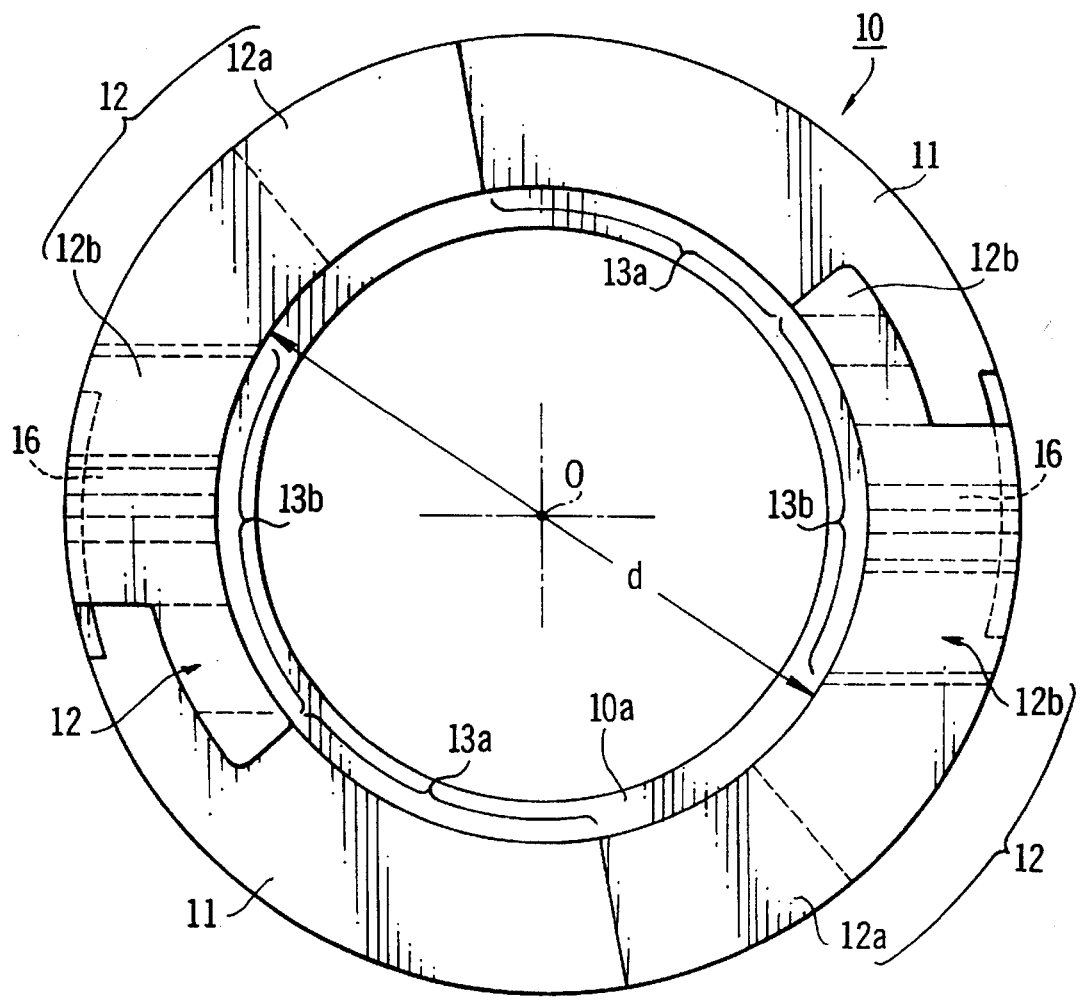
FIG. 7 is a front view of the lens supporting sleeve of FIG. 6.
Figure 8:
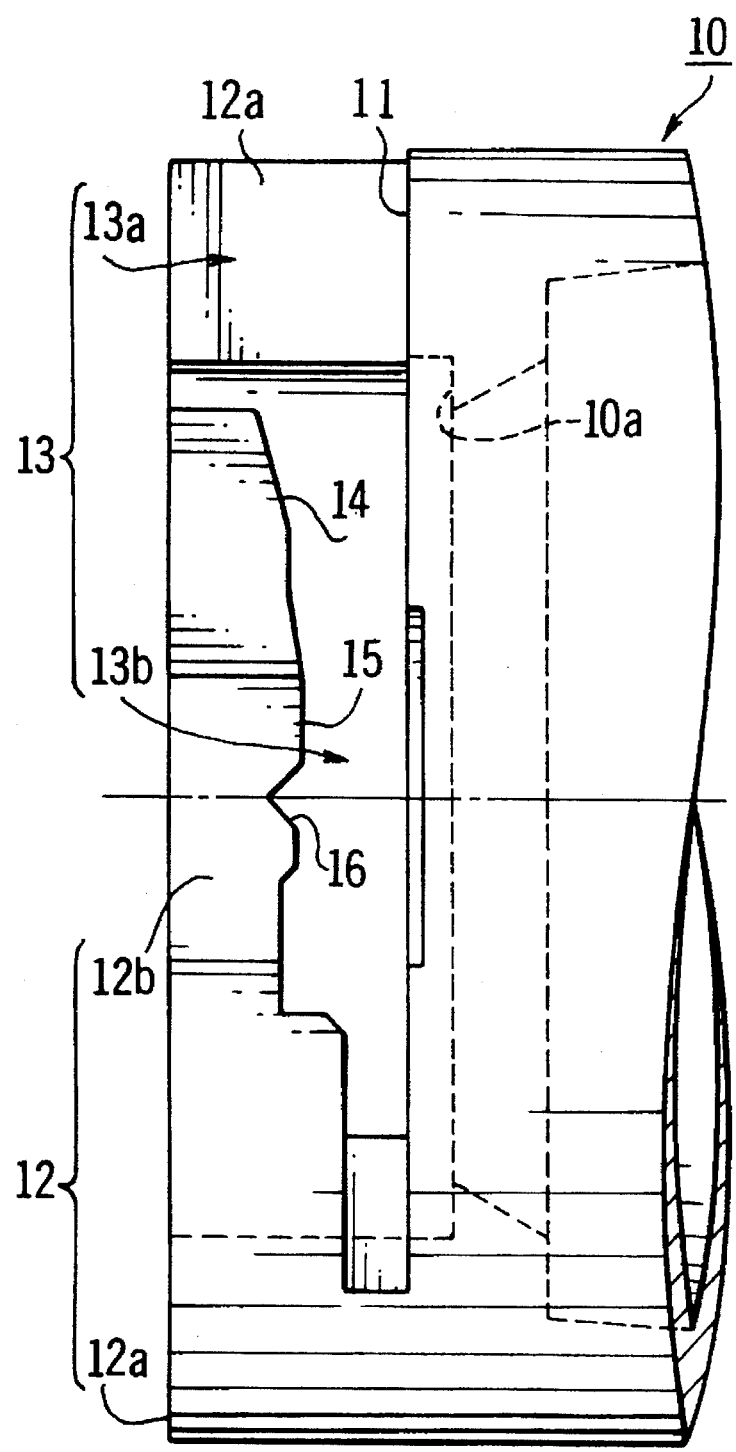
FIG. 8 is a right side view of the lens supporting sleeve of FIG. 6.

FIGS. 6, 7, and 8 illustrate a lens supporting sleeve 10 that also forms a portion Of the lens supporting device of the embodiment. FIG. 6 is a perspective view of the lens supporting sleeve 10, while FIGS. 7 and 8 are front and right side views of the same. The lens supporting sleeve 10 is provided with a reference surface 11 at the front end thereof for positioning the plastic lens 20. The reference surface defines the axial position of the lens 20. Two resilient clamping portions 12, 12 are arranged substantially parallel to the reference surface 11. Specifically, each clamping portion 12 includes one end portion as a base 12a, that extends axially away from the reference surface 11, and the remaining end portion as a resilient clamping arm 12b that extends substantially parallel to the reference surface 11 and in a circumferential direction (both arms 12b, 12b extending in the same direction as each other). The clamping arms 12b are separated from the reference surface 11 by a predetermined amount. The bases 12a, 12a are integral with the lens supporting sleeve 10. The shape of the main supporting sleeve 10 is substantially symmetric when rotated by 180 degrees about the optical axis O (shown in FIG. 7).

The distal end surface of each clamping arm 12b, and the side of the adjacent base portion 12a thereof, forms a guide portion 13a therebetween for receiving one of the radially extending members 22a, 22b of the plastic lens 20. Starting from the distal end of each clamping arm 12b, an introduction surface 14 having inclined steps and a clamping surface 15 are formed opposing the reference surface 11. The separation between each introduction surface 14 and the reference surface 11 generally decreases from the distal end of each clamping arm 12b to the corresponding clamping surface 15. However, the separation between each clamping surface 15 and the reference surface 11 is substantially constant, excepting a recessed engaging groove 16.

Each guide portion 13a and clamping arm 12b forms an L-shaped opening 13 with the reference surface 11. Each L-shaped opening 13 has a guide portion 13a and a clamping portion 13b (shown in FIG. 6). The guide portion 13a is open at the end of the lens supporting sleeve 10, and extends in the axial (optical axis O) direction to the reference surface 11. The width of the guide portions 13a in the circumferential direction is larger than that of the radially extending members 22a, 22b. The clamping portion 13b is open at the guide portion 13a and extends circumferentially, bounded by the reference surface 11, the introduction surface 14, and the clamping surface 15. To secure the lens 20, each radially extending member 22a or 22b is inserted into a corresponding guide portion 13a of the L-shaped opening 13 and rotated into the corresponding clamping portion 13b.

The lens supporting sleeve 10 includes a lens seat 10a formed therein, adjacent the reference surface 11. Inner diameter d of the lens seat 10a (shown in FIG. 7) is set to match an outer diameter D of the circular rim portion 21 of the plastic lens 20 (shown in FIG. 5) in a slip fit.

The recessed engaging groove 16 receives a corresponding convex engaging projection 24 of a corresponding radially extending member 22a or 22b of the plastic lens 20. The engaging groove 16 and engaging projection 24 each extend in a radial direction; in this case, transverse to the direction in which the lens 20 may be rotated to be secured.

Figure 9:
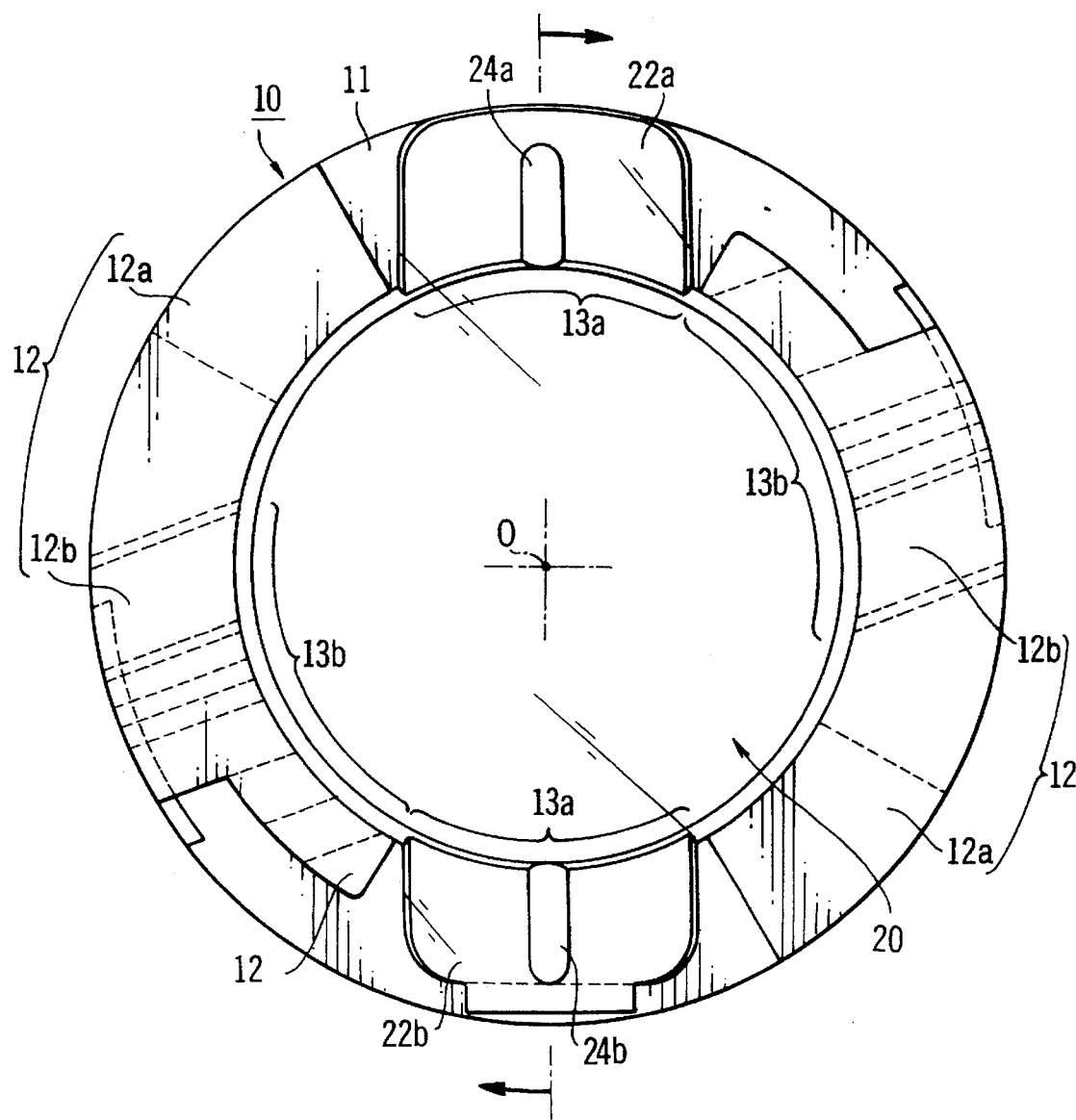
FIG. 9 is a front view of the lens supporting device.
Figure 10:
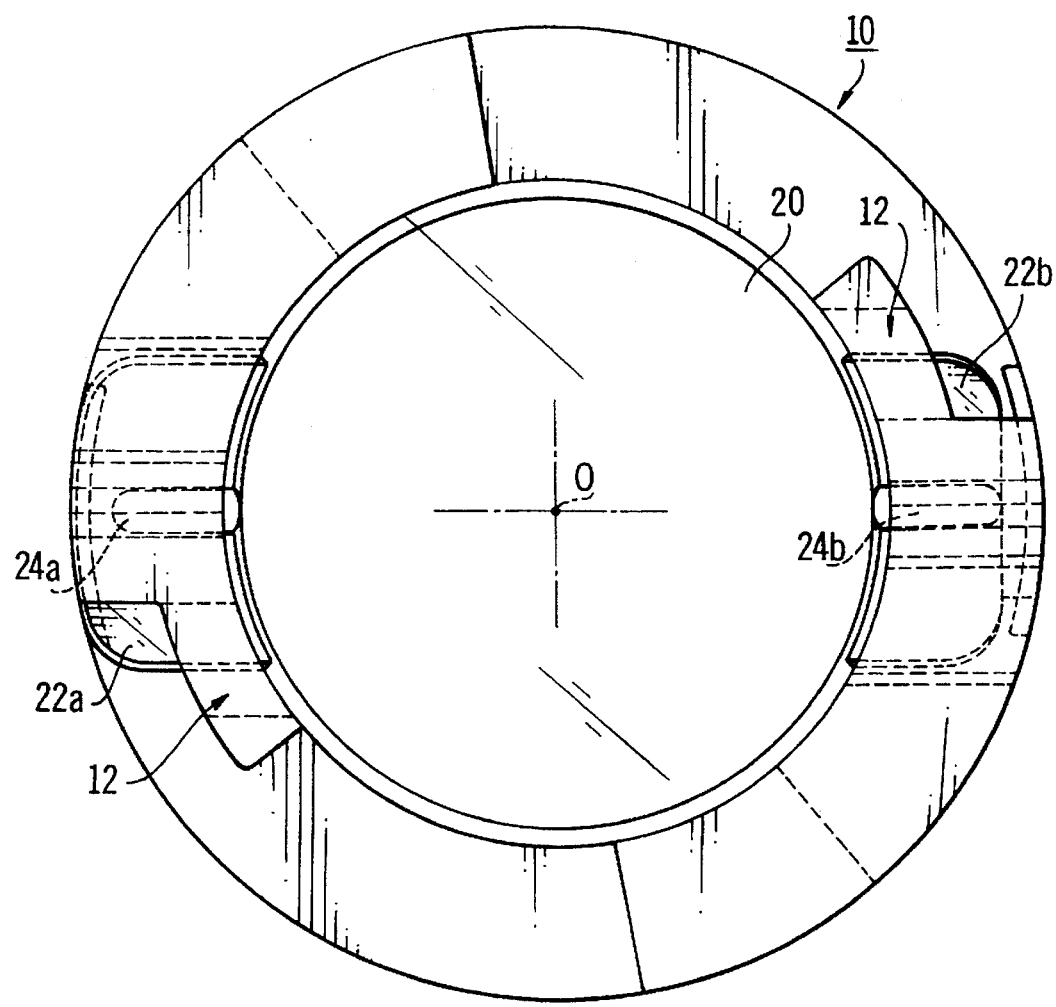
FIG. 10 is a front view of the lens supporting device, showing the lens portion rotated in the clamping direction from the condition shown in FIG. 9.

FIG. 9 is a front view of the lens supporting device, wherein the radially extending members 22a, 22b of the lens 20 meet the guide portions 13a, 13a of the lens supporting sleeve 10; and FIG. 10 is a front view of the lens 20 rotated in the clamping direction with respect to the lens supporting sleeve 10 from the condition shown in FIG. 9.

Figure 11:
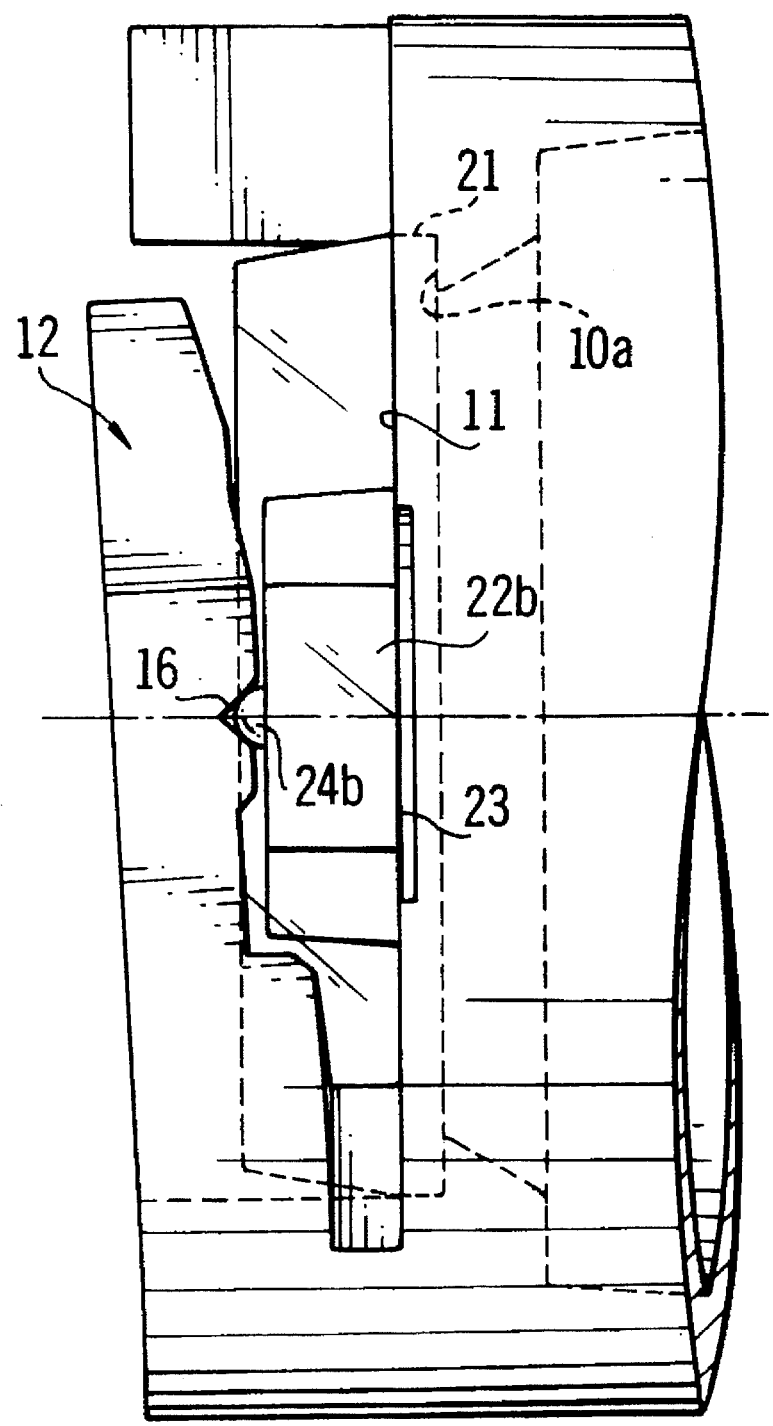
FIG. 11 is a right side view of FIG. 10.

When the lens supporting device is assembled as illustrated in FIG. 9, the radially extending members 22a, 22b of the plastic lens 20 are fit into corresponding guide portions 13a, 13a of the lens supporting sleeve 10, and simultaneously, the circular rim portion 21 is slip fitted into the lens seat 10a of the lens supporting sleeve 10. Subsequently, while pressing the positioning surface 23 of the radially extending members 22a, 22b against the reference surface 11, the lens supporting sleeve 10 and the plastic lens 20 are relatively rotated to lead the radially extending members 22a, 22b into the respective clearances (clamping portions 13b, 13b) between the clamping arms 12b, 12b and the reference surface 11. The radially extending members 22a, 22b are lead past the respective stepped introduction surfaces 14, 14 to the respective clamping surfaces 15, 15 while the convex portions 24a, 24b resiliently deform the respective clamping arms 12b, 12b. Then, as the convex portions 24a, 24b and the corresponding recess portions 16, 16 meet, the resiliently deformed clamping arms 12b, 12b elastically return (snap back), so that the radially extending members 22a, 22b are each clamped and supported (in the clamping portions 13b, 13b) between the reference surface 11 and one of the clamping arms 12b, 12b, as shown in FIGS. 10 and 11. Thus, assembly of the lens to the sleeve is easily accomplished with just this simple procedure.

In the above-described embodiment, although the circular rim portion 21 of the plastic lens 20 is shaped to fit into the lens seat 10a of the lens supporting sleeve 10, depending on the type or shape of the lens, a second circular rim portion 21' may be formed, instead of, or in addition to, the circular rim 21. The second circular rim portion 21' may be formed on the same side of the lens 20 as the convex portions 24, 24, as illustrated in FIG. 5 by the double dotted line. In this case, the second circular rim 21' may be fit into an inner diameter of the lens supporting sleeve 10 formed by the circumferentially extending clamping portions 12, 12.

Furthermore, although the above described embodiment is implemented in an eyepiece lens assembly of a binocular 100, the present invention can be generally applied in other optical devices.

Thus, according to the present invention, the lens supporting device consists of only the lens and the lens supporting sleeve. That is, a lens pressing ring and/or a fixing screw is unnecessary, and the assembly cost is reduced. Furthermore, the size in the radial and the axial directions are minimized. Furthermore, as distorting forces are not applied to the plastic lens, surface precision is not lost, and the desired lens performance is obtained.

The present disclosure relates to subject matter contained in Japanese Patent Application No. HEI 07-005333, filed on Jan. 17, 1995, which is expressly incorporated herein by reference in its entirety.

What is claimed is:

1. A lens supporting device, comprising:

a cylindrical lens supporting sleeve having at least one L-shaped opening formed in one end, said at least one L-shaped opening having a guide portion and a clamping portion, said guide portion being open at said one end and extending from said one end in an axial direction of said lens supporting sleeve, said clamping portion being open at said guide portion and extending in a circumferential direction of said lens supporting sleeve from said guide portion; and a plastic lens having a circular rim portion and at least one unitarily formed radially extending member, said circular rim portion being slip fit into said cylindrical lens supporting sleeve, said at least one unitarily formed radially extending member being clamped by said clamping portion of said at least one L-shaped opening.

2. The lens supporting device according to claim 1, wherein said at least one unitarily formed radially extending member is clamped by said clamping portion of said L-shaped opening by inserting said at least one unitarily formed radially extending member into said guide portion of said at least one L-shaped opening and rotating said at least one unitarily formed radially extending member into said clamping portion of said L-shaped opening.

3. The lens supporting device according to claim 2, wherein a plurality of L-shaped openings are formed in said one end of said lens supporting sleeve, said L-shaped openings being evenly circumferentially distributed about said one end, each of said clamping portions extending in a same circumferential direction as each other, and wherein a plurality of radially extending members are formed on said lens, each of said radially extending members being alignable to said guide portion of a corresponding one of said L-shaped openings, said plurality of radially extending members being inserted into said guide portions of said corresponding L-shaped openings and rotated into said clamping portion of said corresponding L-shaped openings.

4. The lens supporting device according to claim 3, wherein said plurality of L-shaped openings comprise two diametrically opposed L-shaped openings, said plurality of radially extending members comprising two diametrically opposed radially extending members.

5. The lens supporting device according to claim 2, wherein said clamping portion of said at least one L-shaped opening further includes an introduction surface and a clamping surface, and wherein said introduction surface progressively narrows said clamping portion and leads said at least one radially extending member to said clamping surface, and said clamping surface clamps and secures said at least one radially extending member in place.

6. The lens supporting device according to claim 5, wherein said clamping surface includes an engaging groove extending transverse to a direction of said rotation into said clamping portion, and wherein said at least one unitarily formed radially extending member includes an engaging projection on a surface facing said clamping surface and extending transverse to said direction of said rotation into said clamping portion, and said engaging projection engages said engaging groove when said at least one unitarily formed radially extending member is rotated into said clamping portion.

7. The lens supporting device according to claim 6, wherein said engaging projection elastically deforms said lens supporting sleeve as said at least one unitarily formed radially extending portion is rotated into said clamping portion, and said lens supporting sleeve elastically returns when said engaging projection engages said engaging groove.

8. A lens supporting device, comprising:

a plastic lens, said plastic lens including a circular rim, and a plurality of radially extending members, radially extending from said circular rim at predetermined angular intervals; and a lens supporting sleeve for accepting and supporting said plastic lens, said lens supporting sleeve including:
 a reference surface at an end portion thereof, contactable to said radially extending members of said plastic lens, for defining an axial position of said plastic lens,
 a plurality of circumferentially extending resilient clamping arms, each of said clamping arms extending in a same circumferential direction as each other, each of said clamping arms having one end portion integral with said lens supporting sleeve, and a remaining end portion substantially parallel to and having a predetermined separation from said reference surface, and
 a plurality of guide portions formed in said lens supporting sleeve, for guiding said radially extending members of said plastic lens to said separations between said resilient clamping arms and said reference surface, and
 wherein said plastic lens is fit into said lens supporting sleeve by inserting said plurality of radially extending members into said plurality of guide portions until said circular rim contacts said supporting sleeve, said plurality of radially extending members being fit into said separations between said plurality of resilient clamping arms and said reference surface by rotating said lens relative to said lens supporting sleeve.

9. The lens supporting device according to claim 8, wherein a convex portion is formed on at least one of said plurality of radially extending members and said plurality of resilient clamping arms, at least one corresponding recessed portion to be engaged with said convex portion being formed in a remaining one of said radially extending members and said resilient clamping arm opposing said convex portion, and said convex portion and said recessed portion engage when said radially extending members are fit into separations between said plurality of resilient clamping arms and said reference surface.

10. The lens supporting device according to claim 9, wherein each of said plurality of clamping arms includes an introduction surface and a clamping surface, and wherein said introduction surface progressively narrows said separations between said plurality of resilient clamping arms and said reference surface, and leads said plurality of radially extending members to said clamping surface, and said clamping surface clamps and secures said plurality of radially extending members in place.

11. The lens supporting device according to claim 10, wherein said convex portion is formed on at least one of said clamping surface and said plurality of resilient clamping arms, at least one corresponding recessed portion to be engaged with said convex portion being formed in a remaining one of said clamping surface and said resilient clamping arm opposing said convex portion.

12. The lens supporting device according to claim 11, wherein said at least one convex portion elastically deforms at least one of said resilient clamping arms a said radially extending portion is rotated into said clamping portion, and said at least one of said resilient clamping arms elastically returns when said convex portion engages said recessed portion.

13. A lens supporting device, comprising:

a plastic lens having a circular rim portion and a plurality of unitarily formed extensions extending from said circular rim portion; and a lens supporting sleeve, comprising:
 a lens seat at one end of said lens supporting sleeve, for accepting said circular rim portion;
 a reference surface at said one end of said lens supporting sleeve;
 clamping means for resiliently biasing each of said plurality of unitarily formed extensions individually against said reference surface;
 engaging means for engaging said plurality of unitarily formed extensions and for preventing a rotation of each of said plurality of unitarily formed extensions individually with respect to said reference surface; and
 guiding means for guiding said plurality of unitarily formed extensions to be engaged by said engaging means.

14. The lens supporting device according to claim 13, wherein said clamping means comprises a plurality of circumferentially extending resilient clamping arms, each of said clamping arms extending in a same circumferential direction as each other, each of said clamping arms having one end portion integral with said lens supporting sleeve, and a remaining end portion substantially parallel to and having a predetermined separation from said reference surface.

15. The lens supporting device according to claim 14, wherein said engaging means comprises a plurality of recessed portions for engaging said plurality of unitarily formed extensions, said recessed portions being formed in said plurality of resilient clamping arms opposing said plurality of unitarily formed extensions.

16. The lens supporting device according to claim 15, wherein each of said plurality of unitarily formed extensions includes a convex portion for engaging said recessed portions of said plurality of resilient clamping arms.

17. The lens supporting device according to claim 13, wherein said guiding means comprises a plurality of guides formed in said lens supporting sleeve, each of said guides leading a corresponding one of said plurality of unitarily formed extensions from one end of said lens supporting sleeve to said engaging means.

18. The lens supporting device according to claim 17, wherein each of said guides is shaped as an L-shaped opening having a guide portion and a clamping portion, said guide portion being open at one end and extending from said one end in an axial direction of said lens supporting sleeve, and clamping portion being open at said guide portion and extending in a circumferential direction of said lens supporting sleeve from said guide portion.

19. The lens supporting device according to claim 18, wherein said engaging means is provided on a surface of each of said plurality of clamping portions.

* * * * *

UNITED STATES PATENT AND TRADEMARK OFFICE
CERTIFICATE OF CORRECTION

PATENT NO. : 5,642,235
DATED : June 24, 1997
INVENTOR(S) : Mituru ICHIKAWA

It is certified that error appears in the above-indentified patent and that said Letters Patent is hereby corrected as shown below:

At column 8, line 15 (claim 12, line 3), change "a" to ---as---.

Signed and Sealed this

Thirtieth Day of December, 1997

Attest:

BRUCE LEHMAN

Attesting Officer

Commissioner of Patents and Trademarks